United States Patent [19]

Gidaspow et al.

[11] 4,341,539
[45] Jul. 27, 1982

[54] THERMALLY REGENERATIVE DESICCANT ELEMENT

[76] Inventors: Dimitri Gidaspow, 1517 Cedar La., Northbrook, Ill. 60062; Zalman Lavan, 947 Ridge Ct., Evanston, Ill. 60202; Michael Onischak, 3408 Ithaca Rd., Olympia Fields, Ill. 60461

[21] Appl. No.: 215,815

[22] Filed: Dec. 12, 1980

Related U.S. Application Data

[63] Continuation-in-part of Ser. No. 65,569, Aug. 10, 1979, abandoned.

[51] Int. Cl.³ .............................................. B01D 53/04
[52] U.S. Cl. .................................... 55/278; 55/387; 55/179; 55/208; 252/428
[58] Field of Search ................ 55/179, 278, 280, 387, 55/208; 252/428

[56] References Cited

U.S. PATENT DOCUMENTS

| | | | |
|---|---|---|---|
| 438,998 | 10/1890 | Glew | 55/387 |
| 1,839,168 | 12/1931 | Stampe | 55/387 |
| 2,842,223 | 7/1958 | Zall | 55/387 |
| 3,091,550 | 5/1963 | Doying | 55/387 |
| 3,304,696 | 2/1967 | McKenna | 55/278 |
| 3,479,018 | 11/1969 | Jaye | 55/278 |
| 3,626,671 | 12/1971 | Ebeling, Jr. | 55/179 |
| 3,687,297 | 8/1972 | Kuhn et al. | 55/387 |
| 3,704,806 | 12/1972 | Plachenov et al. | 55/387 |

FOREIGN PATENT DOCUMENTS

| | | | |
|---|---|---|---|
| 2810269 | 9/1979 | Fed. Rep. of Germany | 55/179 |
| 54-6345 | 1/1979 | Japan | 55/278 |
| 54-8020 | 4/1979 | Japan | 55/278 |
| 2005016 | 4/1979 | United Kingdom | 55/387 |

*Primary Examiner*—David L. Lacey
*Attorney, Agent, or Firm*—Dressler, Goldsmith, Shore, Sutker & Milnamow, Ltd.

[57] ABSTRACT

A thermally regenerative desiccant element comprising micron size silica gel and held within an expanded web of a fluoroplastic elastomer is disclosed. The expanded web of silica gel is bonded onto a heat conductive plate to form the desiccant element. The desiccant elements are stacked in an arrangement such that the air to be processed passes in contact with the silica gel. The other side of the plate is made to come in contact with a stream of humidified cooled air. The cooled air removes the heat of sorption when the silica gel sorbs moisture. A solar collector is used to heat ambient air for regeneration of the silica gel.

4 Claims, 3 Drawing Figures

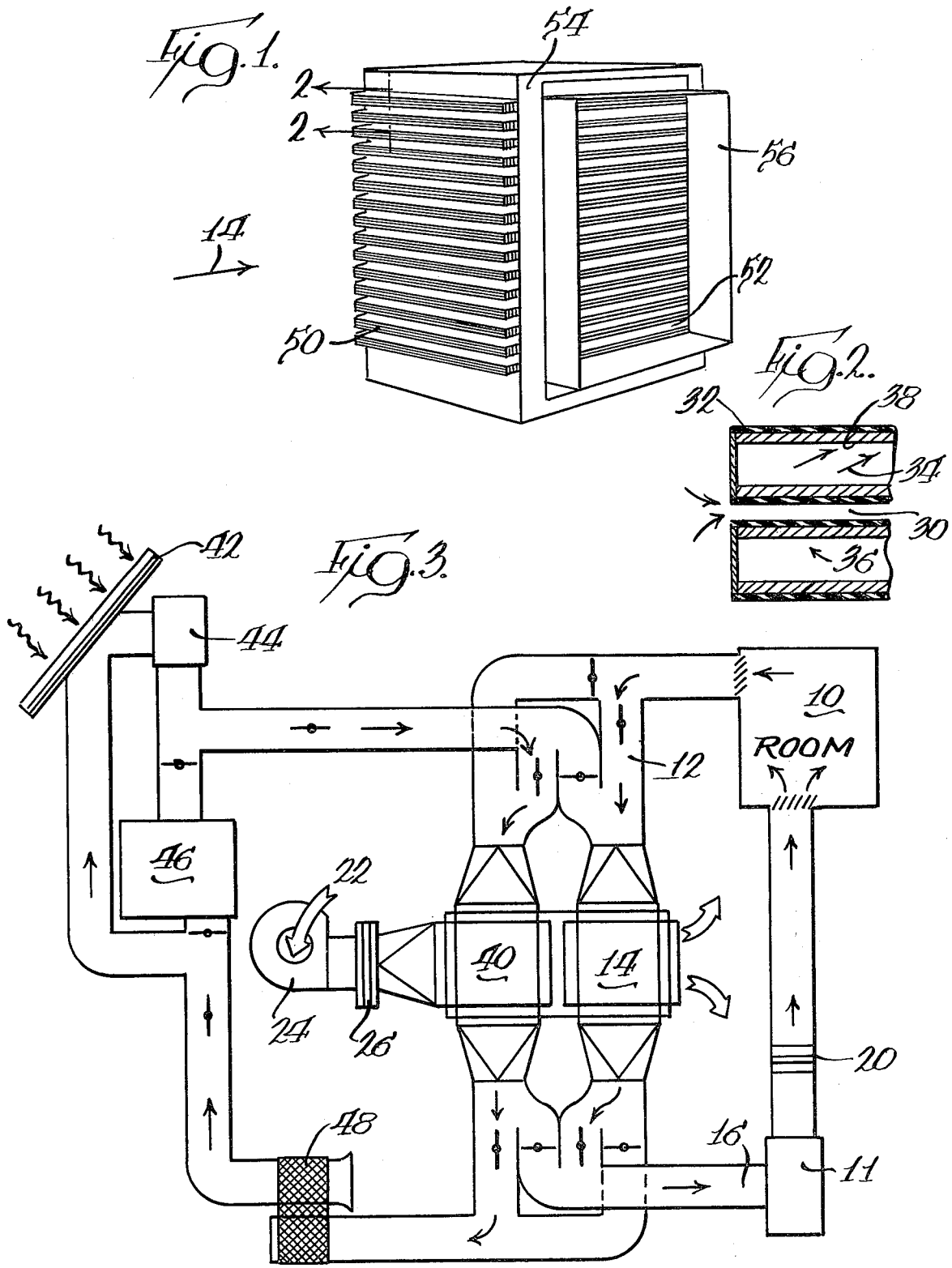

THERMALLY REGENERATIVE DESICCANT ELEMENT

This application is a continuation-in-part of application Ser. No. 65,569, filed Aug. 10, 1979, now abandoned.

TECHNICAL FIELD

Apparatus for dehumidifying air using the moisture sorption property of silica gel including apparatus for regeneration of silica gel using solar heating and cross cooling. An article of manufacture composed of micron-size silica gel in an elastomer web for use as a desiccant in a thermally regenerative dehumidifier.

BACKGROUND OF THE INVENTION

The air drying properties of sorbents such as silica gel, lithium chloride, and alumina are well known and have been used in many industrial applications. However, the applicability of these sorbents, and in particular silica gel, as a desiccant in an air conditioning system has been explored only recently.

One of the pioneering systems was the Munters Environmental Control (MEC) System developed at the Institute of Gas Technology (IGT). In that system a rotating matrix, consisting of a series of channels whose walls are made of a sorbent, exchanges moisture and heat with a stream of air flowing through it. The MEC concept has been known for about thirty years. The first patent covering this principle was issued in 1949. Despite efforts by both the U.S. and European organization over the years, the concept was never successfully developed to a commercial reality. IGT became interested in the potential advantages of MEC about thirteen years ago. It applied modern engineering analysis and computer modeling techniques to study the system. IGT's wholly owned subsidiary, Gas Developments Corporation, gained a license for the patent from A. B. Carl Munters of Sweden, the owner of the patent. The IGT modifications included an asbestos-wax, heat-transfer wheel and an asbestos-lithium chloride drying wheel.

Another variation, MEC II, used an aluminum heat transfer wheel to improve heat transfer efficiency. The aluminum wheel, however, became hygroscopic with time, absorbing water and transferring it to the conditioned dry air stream. Also, the lithium chlorine on the drying wheel deteriorated into other compounds that could not carry out the drying function.

In another variation, MEC III, constructed in 1973, the aluminum wheel was coated with a proprietary material that reduced the water carry-over to an acceptable level. The drying wheel used a newly perfected molecular sieve absorbent material. The new material was a paper-thin asbestos sheet carrying over 50% molecular sieve. The sheet was corrugated and formed into a wheel. Later that device was adapted to use solar heat and a natural gas boost to make up for the solar heating deficiency.

Pennington (U.S. Pat. No. 2,700,537) describes a humidity changer for air conditioning that uses a rotary moisture transferrer packed with an inert, air-pervious carrier having a rigid space structure, and impregnated with a liquid sorbent.

Another wheel-type humidifier was built by Cargocaire under the brand name "HoneyCombe." In that device a wheel core was made of a non-metallic, non-corrosible, bacteriostatic, inert structure impregnated with an inorganic, non-granular, crystalline, particle solid desiccant which transfers water in the vapor phase. The desiccant was evenly dispersed throughout the microscopic pores of the wheel structure. The wheel structure consisted of small flutes or tubes parallel to the axis of flow, allowing laminar air flow to give the maximum moisture transfer with minimum friction loss. Humid air passing through the flutes was dried. Simultaneously, a counterflowing hot reactivation air stream passed through the flutes in the reactivation sector to remove the moisture picked up by the desiccant thus assuring continuous controlled drying.

The capacity of such exchangers is generally reduced due to the large heat effects associated with sorption of water. This is because at a given humidity the equilibrium capacity of a sorbent decreases with temperature. There is another problem resulting from this reduced capacity at higher temperatures. After regeneration the matrix, in which the hygroscopic salt is held, is left at a high temperature. During sorption, although the relatively cooler incoming air cools the matrix down, the heat effect associated with sorption may not allow the desired level of humidity in the outgoing air. As a remedy, cooling of the solid during sorption has been suggested to obtain the desired temperature and humidity levels. This can be accomplished by using a cross-flow heat exchanger where the cooling and the process streams are separated by a solid wall; and where the cooling and process streams flow perpendicular to each other.

Among the common desiccants used for drying air silica gel has the unique property of showing a sharp decrease in the equilibrium sorptive capacity with a temperature increase at a given partial pressure of water over it. Although silica gel can be regenerated at lower temperatures than other desiccants (such as molecular sieves or activated alumina), the immediate disadvantage arising from a sharp decrease in capacity with an increase in temperature is that in an adiabatic rotary dehumidifier (with alternate sorption and desorption) the desired humidity level may not be achieved during sorption. If with the help of cross-cooling, the desired humidity level can be achieved, silica gel would then become a desirable desiccant in a rotary dehumidifier. Cross-cooling would delay the "break-through" time for drying operations thus allowing a slower speed of rotation for a rotary exchanger than for the corresponding adiabatic case.

Alternatively, for a given breakthrough time and process channel width, channel length would be reduced to cross-cooling. More importantly, there is an accompanying reduction in volume occupied by the process channel compared to the adiabatic case. However, part of this advantage is lost due to the increased volume accompanying the addition of cooling channels.

A quantitative study of a cross-cooling dehumidifier was performed and reported in *Chemical Engineering Science* 1974, volume 29, pages 2101 through 2114. That study showed that cross-cooled dehumidifiers can be smaller and require less power than corresponding adiabatic exchangers. Those calculations also showed that regeneration temperatures below 180° F. in conjunction with cross-cooling result in sufficient dehumidification for air conditioning applications.

A solar powered dehumidifier was proposed by the Energy Research and Development Authority (ERDA) under its Solar Activated Cooling (SAC)

project. It was recognized that solar energy in the form of heat could be used to dehydrate the desiccant thus closing the functional cycle.

SUMMARY OF THE INVENTION

A cross-cooled solar powered air conditioning system using silica gel has been developed and found to perform in an extremely effective manner. Desiccant materials which by nature readily remove water vapor from the atmosphere are prime candidates for meeting the requirement for dehumidification of air conditioning loads. Solar energy or any other low level heat source is used to dehydrate the desiccant thus closing the functional cycle.

Solar powered dehumidification is an excellent way to use solar power in the cooling season. The latent-heat load on conventional air conditioning and heat pump systems is significant, and if removed by desiccant dehumidification, the consumption of non-solar energy would be significantly reduced. Dehumidification is required for the ventillation of hospitals and many other public buildings. It is a requirement that will tend to grow as building construction techniques become more and more conserving creating new controlled ventillation demands. More importantly, solar powered dehumidification will enhance the cost effectiveness of many solar-powered or conventional air conditioning devices such as solar absorption or Rankine-cycle chillers or conventional vapor compression chillers.

The system consists of two identical fixed bed dehumidifiers. One bed dehumidifies while the other bed is being regenerated. Cross-cooling is achieved with cooling air flowing through rectangular flow channels. The process stream flows in perpendicular flow channels which are lined with paper-like sheets consisting of micron-size silica gel particles held in a TEFLON web.

The dehumidifier beds are formed from a stack of trays lined with sheets of micron size silica gel particles held in a web of TEFLON. In manufacturing the sheets, a paste is formed from TEFLON powder, silica gel particles, a solvent, and a gas producing means, such as ammonium bicarbonate. The resulting paste is formed into sheets by roller reduction. After drying the sheets are heated to decompose the gas producing means thereby increasing the porosity of the web of TEFLON and silica gel. The thin sheets of silica gel form individual elements of a desiccant dehumidifier bed.

Dampers are provided to direct air, heated by solar collectors, into contact with the silica gel to regenerate or drive off the moisture sorbed by the silica gel. A solar heat storage system provides a source of heat when the solar collector is not available. An overall coefficient of performance of 0.5 to 0.7 and a regeneration temperature of 60° C. to 82° C. have been predicted. This low regeneration temperature will also permit the use of waste heat. Due to the low pressure drop in the flow channels, the electric coefficient of performance (EER) is expected to be very high (about 30).

The advantages of this dehumidifier are:
(a) the desorption temperature is low since the desiccant is silica gel;
(b) the sorption capacity is high as a result of cross-cooling;
(c) the sorption rates are high due to low compactness of silica gel particles (specifically, about 40% of the sheet volume is silica gel); and
(d) the pressure drop in the channels is low compared to the pressure drops across a packed bed.

Numerous other advantages and features of the present invention will become readily apparent from the following detailed description of the invention and of the embodiment disclosed, from the claims and from the accompanying drawings.

BRIEF DESCRIPTION OF THE SEVERAL VIEWS OF THE DRAWINGS

FIG. 1 is a representation of the dehumidifier bed before being connected to the associated duct work;

FIG. 2 is a partial cross view of one of the dehumidifier bed trays as viewed along line 2—2 of FIG. 1; and FIG. 3 is an overall view of the major components of an air conditioning system utilizing the desiccant bed as a dehumidifier.

DETAILED DESCRIPTION OF THE INVENTION

While this invention is susceptible of embodiment in many different forms, there is shown in the drawings and will herein be described in detail a preferred embodiment, with the understanding that the present disclosure is to be considered as an exemplification of the principles of the invention and is not intended to limit the invention to the embodiment illustrated.

Silica gel is a regenerative sorbent consisting of amorphous silica. It has found many applications in the dehumidifying and dehydrating of air. It also has been extensively studied as a humidity controlling desiccant. However, it was only recently that silica gel was considered for use in air conditioning. For many years, it was thought to be unsuitable for use in air conditioning cycles because of the heat needed to drive off the moisture sorbed in the silica gel. Other systems were more efficient thermodynamically (i.e., Rankine cycle). However, when the price of energy is factored into the analysis, silica gel regenerated by solar heat is competitive to other cooling systems. This competitive edge is expected to increase as solar collectors are perfected and the price of traditional fuels increases.

Detailed calculations have shown that regeneration temperatures below 82° C. (in conjunction with cross-cooling) result in sufficient dehumidification for air conditioning applications. In particular, the low regeneration temperature permits the use of a flat plate solar collector as a source of heated air. If these collectors are used for both heating and cooling the "payback period" is accelerated and the "first cost" of the investment more easily justified relative to conventional heating and air conditioning installations.

Silica gel's affinity for water has been described as absorption by some investigators and adsorption by others. Since the particular process is not relevant to the understanding of the invention, the term "sorption" has been used throughout this specification to indicate the process of removing moisture from an air stream. Similarly, "desorption" will be used to describe the release of moisture to the atmosphere when silica gel is heated.

COOLING SYSTEM

FIG. 3 shows the principal features of the cross-cooled desiccant cooling system operating in the recirculation mode. Humid air from a room 10 (i.e., the one to be air conditioned) is drawn by a blower 11. It passes through dampered cuts 12 into desiccant lined flow channels of a bed 14 (see FIG. 1) of silica gel and exits as a dry, moderately warm air. This air flow is referred to as a "process stream." Dampered ducts 16, downstream of the silica gel bed 14, direct the process stream to a chamber 20 where it is sprayed with water before being admitted to the housing 10. The water spray removes a portion of the heat of sorption transferred to the process stream in passing through the desiccant bed 14.

A large portion of the heat evolved during dehumidification is removed by a stream of ambient air 22 drawn by a blower 24. This flow is ducted through channels in the bed of silica gel 14 on service. These cooling channels are perpendicular to those of the process stream. This second or "heat exchange" flow stream is partially cooled by adiabatic humidification in passing through a water spray chamber or recooler 26 before being directed to the desiccant beds 14 and 40. It is discharged to the ambient air after passing through the desiccant beds.

FIGS. 1 and 2 show the relationship of these two flow streams. The process stream flows in the flow channels 30 lined with silica gel sheets 32; the heat exchange flow stream 34 flows in channels 36 perpendicular to the silica gel lined channels 30. The silica gel sheet 32 is bonded to the walls or trays 38 dividing the two flow channels.

One desiccant bed 40 (see also FIG. 1) is shown being regenerated directly with a solar source 42. The other bed 14 is on service dehumidifying the process stream. The desiccant bed 40 desorbs (releases moisture) using air heated by the solar source 42 or storage 46 circulated by the third fan 44. This flow stream is defined as the "regeneration flow stream." The regeneration air stream from this bed 40 is discharged to the atmosphere since it has a high moisture content and therefore cannot be reused. A sensible heat exchanger or preheater 48 is used to heat ambient air which replaces the rejected humid air. This improves the utilization of solar energy and increases the overall efficiency of the cycle. The cycle may also be improved by recovery of waste heat from other equipment and systems. Suitable ductwork and dampers join the major components of the regeneration flow stream. The details of the design of the solar collector 42 and the heat storage mechanism 46 (i.e., water, rocks, salts, etc.) follow principles known to those skilled in the art.

When both beds have completed desorption and sorption, the sensible heat stored in the desorbed bed is used to preheat the bed which has just completed sorption. This is done by using the cross-cooling blower 24 to push air from the hot bed 40 into the cool bed 14. Next, the flow of air in the system is rerouted (using appropriate dampers and duct work) and the functions of the two beds are interchanged. This process improves the solar energy utilization of the desiccant beds and adds to the overall efficiency of the cycle.

The dampers and duct arrangements shown in FIG. 3 are representative of one embodiment of the invention. Other arrangements, including the use of motorized dampers and automatic controls, may be employed following methods known to those skilled in the art.

In a specific embodiment of this invention a dehumidifier housing 60×60×60 centimeters was built (see FIG. 1). It included space for a bed 14 of eighty trays 50 made of 0.2 millimeters aluminum. The trays were dimpled to insure that the cooling channels 52 remain rigid and open. Silica gel sheets 32 approximately 1.5 millimeters thick were bonded (using Glyptal 1201B—a red enamel manufactured by General Electric) to the outer surface of each tray. The trays are then assembled in a vertical stack with the aid of four side supports 54. Four corner flanges 56 complete the assembly. These flanges facilitate joining the bed to ductwork and form inlet and outlet plenums. The total weight of the unit is about 66 kilograms about half of which is silica gel. Tests have shown that unit performance improves sharply with an increasing process air dew point. It also has been demonstrated that if the dew point of the regenerating air increases, unit performance drops. For the adiabatic case (i.e., no cross-cooling), the total moisture cycled is only 5% relative to the total weight of silica gel in the unit. However, if cross-cooling is used, the moisture cycled increases to 7.4%. At higher cross-cooling flow rates, it is possible to increase the moisture cycled to 8.2%. The important conclusion is that moderate cross-cooling increases the performance of the silica gel sheets by 50%. It can be concluded that the performance of a cross-cooled desiccant dehumidifier improves with:

(a) increasing inlet process air dew point;
(b) increasing process air flow rate;
(c) increasing regeneration temperature;
(d) increasing cross-cooling (heat exchange) stream flow rate; and
(e) decreasing regeneration air inlet dew point.

In each case, micron-size silica gel, previously ground ammonium bicarbonate (20 to 80 percent by weight) and polytetrafluoroethylene (TFE) power (i.e., TEFLON were blended together with an adequate quantity of an aliphatic petroleum solvent. The solvent serves as a processing aid. The resulting paste was filtered to form a cake and then physically worked by roller reduction to form a sheet of silica gel held in a web-like structure of TFE. A final reduction was made to produce desiccant sheets of the required thickness and size for the dimensions of the dehumidifier housing (see FIG. 1). The wet sheets were dried overnight (about 12 hours). Finally, the ammonium bicarbonate was made to decompose by heating the desiccant sheet at a temperature of from 100° C. to 130° C. for about 30 minutes. When the sheet was viewed through an electron microscope, the silica gel particles are shown to be held together by means of thin strands of TFE. The structure resembles that of a three dimensional net or web.

DESICCANT SHEETS

The dynamics of water vapor sorption is affected by desiccant sheet thickness, the particle size of the silica gel used in the preparation of the desiccant sheets, and by the density or porosity of the desiccant sheets. Each desiccant sheet is an elastomeric web of micron-size silica gel. The porosity of the sheet was enhanced by the use of a gas producing means, such as ammonium bicarbonate. Table I shows three typical starting compositions that were found to produce good quality desiccant sheets.

More specifically, Davison Syloid-63 nine micron size particles were used as the silica gel. Particle sizes from 1 to 1000 microns should do equally as well. Shell Solv 340 (manufactured by the Shell Oil Company) was the aliphatic petroleum solvent that was used to blend the TFE powder with the silica gel. It has a boiling point between 300° F. and 350° F. One simply adds whatever solvent necessary to convert the blend of silica gel and ammonium bicarbonate into a paste. If too much solvent is added, the "paste" becomes too fluid. If too little solvent is added, the "paste" becomes too crumbly to be self-adherent. There may or may not be an excess amount of solvent present in the paste when sheet formation begins. If there is, then that excess is simply filtered off using conventional techniques. Alternatively, more solid matter can be added. All of the solvent is eventually evaporated away. These considerations are not beyond those skilled in the art.

TFE is a fluorocarbon resin and is available in a wide variety of dry power and water-base dispersion forms. TFE is sold under the HALON trademark (Allied Chemical Corporation) the TEFLON trademark (DuPont Co.) and the FLUON trademark (ICI United States Inc.). Because TFE resists forming even temporary bonds with other molecules, nothing sticks to it. Other substances slide over it readily. These properties and characteristics are of importance in the thermally regenerative dehumidification process described previously. Temperature resistance and resistance to deterioration ensure a long maintenance free operating cycle and greater acceptance in the market place, thus leading to a greater likelihood of commercial acceptance and a willingness by the public to convert from conventional dehumidifiers.

Although the desiccant sheets described above were specifically formed from TFE, the important characteristic and function served by TFE is the creation of stringy fibers to hold the silica gel particles together. Consequently, other elastomers of a low density and similar stiffness may be used.

The ammonium bicarbonate gas producing means improved the porosity (i.e., addition of voids) of the desiccant sheets. Subsequent heating, after sheet formation drives off the processing air (ex. Shell Solv 340) an decomposes the ammonium bicarbonate:

$$NH_4 HCO_3 = NH_3 + CO_2 + M_2O$$

One advantage of ammonium bicarbonate is that it produces gas (i.e., ammonia, carbon dioxide, and steam) without leaving a residue. This insures the web-like bonding of the silica gel without restricting the sorption property of silica gel.

Sheet thickness can be varied from 0.1 millimeters to 10 millimeters by the rolling operation previously described. It was found that the density or porosity of the desiccant sheet can be varied by using various ratios of ammonium bicarbonate. Use of too much ammonium bicarbonate produces a desiccant sheet that falls apart. Use of too little ammonium bicarbonate produces a sheet that has insufficient porosity for rapid adsorption. The particular desiccant sheet density and porosity used with the dehumidifying apparatus previously described is dependent upon whether a high sorption rate or a high sorption capacity is desired.

Porous silica gel sheets can also be made by use of salts of sodium or potassium bicarbonates. Decomposition of these salts produces a gas, carbon dioxide, that can form a porous structure. However, a solid product consisting of carbonates is left behind which adds to the weight of the sheet and also permits a reaction with the carbon dioxide found in air, causing a possible deterioration of the sorption capacity of the sheet due to pore closing. Substances other than ammonium bicarbonates which also leave no residues are ammonium carbonate [$(NH_4)_2 CO_3 \cdot H_2O$] Camphor and Napthalene. This latter group of substances, as well as ammonium bicarbonate, are the preferred means of forming of the porous web-like structure of the desiccant sheets. Since all of the products are a gas, they are best described as a means for producing gas within the matrix of silica gel and TFE by thermal decomposition.

From the foregoing, it will be observed that numerous variations and modifications may be effected without departing from the true spirit and scope of the novel concept of the invention described. It is to be understood that no limitation with respect to the specific apparatus illustrated herein is intended or should be inferred. It is, of course, intended to cover by the appended claims all such modifications as fall within the scope of the claims.

TABLE I

| Sheet Density | Dessicant Sheet Compositions | | | | | | | | |
|---|---|---|---|---|---|---|---|---|---|
| | 0.40 g/cm$^3$ | | | 0.44 g/cm$^3$ | | | 0.54 g/cm$^3$ | | |
| (Dry) | grams | % wet | % dry | grams | % wet | % dry | grams | % wet | % dry |
| Silica Gel | 60 | 16.4 | 91.6 | 90 | 22.7 | 93.5 | 200 | 64.1 | 94.4 |
| Ammonium Bicarbonate | 300 | 82.1 | — | 300 | 75.7 | — | 100 | 32.1 | — |
| TEFLON | 5.498 | 1.5 | 8.4 | 6.26 | 1.6 | 6.5 | 11.846 | 3.8 | 5.6 |
| Sheet Thickness, wet, mm | 4.7 | | | 6.4 | | | 1.5 | | |
| Sheet Thickness, dry, mm | 1.5 | | | 3.2 | | | 1.5 | | |

NOTES:
"Wet" refers to before solvent evaporation and ammonium bicarbonate decomposition
"Dry" refers to final preparation

What is claimed is:

1. A desiccant element, comprising: micron size silica gel, ground ammonium bicarbonate and a fluoroplastic powder blended into a paste and physically worked into a thin sheet by roller reduction, said ammonium bicarbonate then having been made to decompose by heating said sheet; and wall means connected to said sheet for conducting heat away from said sheet and for supporting said sheet on one of its sides, whereby thermal energy on the other side of said wall means is conducted to said sheet to drive off moisture held by said silica gel and regenerate said desiccant element and a portion of the heat liberated from said silica gel upon the sorption of moisture is transferred to the other side of said wall means.

2. A thermally regenerative desiccant element, comprising:
   (a) a plurality of micron-size silica gel particles;
   (b) an expanded elastomer web for holding and distributing said silica gel particles, said elastomeric web of silica gel particles being expanded by percolating gas through the web of silica gel particles, said gas being released by heating a gas producing means, originally blended together with said silica gel and said elastomer for producing gas within said web by thermal decomposition, the released gases having been used to stretch apart the strands of said elastomer web to form a thin, stringy, net-like structure, whereby the porosity of said elastomer web is increased; and (c) wall means connected to said web for carrying said expanded elastomer web of silica gel for conducting heat away from said silica gel, heat being liberated from said silica gel upon the sorption of moisture.

3. The thermally regenerative desiccant element defined in claim 2, wherein said gas producing means is ammonium bicarbonate.

4. The thermally regenerative desiccant element defined in claim 3, wherein said elastomer web of silica gel was formed from a blend of: micron-size silica gel; ground ammonium bicarbonate in a range from about 20 to 80 percent by weight; and about 5 percent by weight fluoroplastic powder in an adequate quantity of a naphtha based solvent so as to form a paste, said paste having been filtered to remove any excess solvent and then physically worked by roller reduction to form a thin sheet, heating said sheet between 100° C. and 130° C. having the effect of decomposing said ammonium bicarbonate, the gases of decomposition stretching apart the matrix formed by the elastomer and silica gel and producing voids without leaving a solid residue.

* * * * *